Figure 1:
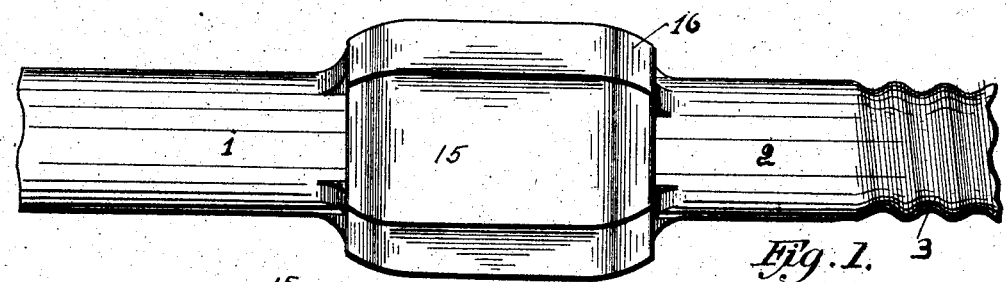

No. 786,929. PATENTED APR. 11, 1905.
W. J. WILLIAMS.
PIPE OR HOSE COUPLING.
APPLICATION FILED JULY 20, 1904.

Witnesses:

Inventor
W. J. Williams.
By N. C. Ewert & Co.
Attorneys.

No. 786,929.

Patented April 11, 1905.

UNITED STATES PATENT OFFICE.

WILLIAM J. WILLIAMS, OF BALDWIN TOWNSHIP, ALLEGHENY COUNTY, PENNSYLVANIA, ASSIGNOR OF ONE-HALF TO WILLIAM T. WAITE, OF PITTSBURG, PENNSYLVANIA.

PIPE OR HOSE COUPLING.

SPECIFICATION forming part of Letters Patent No. 786,929, dated April 11, 1905.

Application filed July 20, 1904. Serial No. 217,351.

*To all whom it may concern:*

Be it known that I, WILLIAM J. WILLIAMS, a citizen of the United States of America, residing in Baldwin township, in the county of Allegheny and State of Pennsylvania, have invented certain new and useful Improvements in Pipe or Hose Couplings, of which the following is a specification, reference being had therein to the accompanying drawings.

This invention has relation to pipe-couplings, and more particularly to that class which are employed and commonly known as "hose-couplings;" and the invention has for its object the provision of novel means for securing two sections of pipe together whereby they will be firmly and rigidly held and the connection between the same will be non-leakable.

Another object of this invention is to provide a novel form of lock for securing two sections of pipe together, the lock being so constructed that it may be quickly and easily manipulated to secure the members in engagement with each other whereby the connection between the pipe-sections will be non-leakable and of such a construction that the same will withstand the rough use to which pipe connections, such as hose-couplings, are oftentimes subjected.

The invention has for its further object the construction of a pipe connection which will be strong and durable, extremely simple in construction, comparatively inexpensive to manufacture, and highly efficient when used to secure two pipe-sections together.

Briefly described, the pipe-coupling consists of providing each member of the pipe to be secured together with a plurality of outwardly-extending wedge-shaped arms which are provided with teeth, and when the two sections are placed together these outwardly-extending arms are adapted to interlock with one another, and over the interlocking arms is adapted to be placed a sleeve which has wedge-shaped grooves formed therein, and in these sleeves the outwardly-extending arms are adapted to impinge. I employ a washer which is interposed between the ends of the pipe-sections, and I preferably form one section of pipe with a concave seat in which the end of the other pipe-section is adapted to fit.

All of the above construction will be hereinafter more fully described and then specifically pointed out in the claims, and, referring to the drawings accompanying this application, like numerals of reference indicate like parts throughout the several views, in which—

Figure 2:
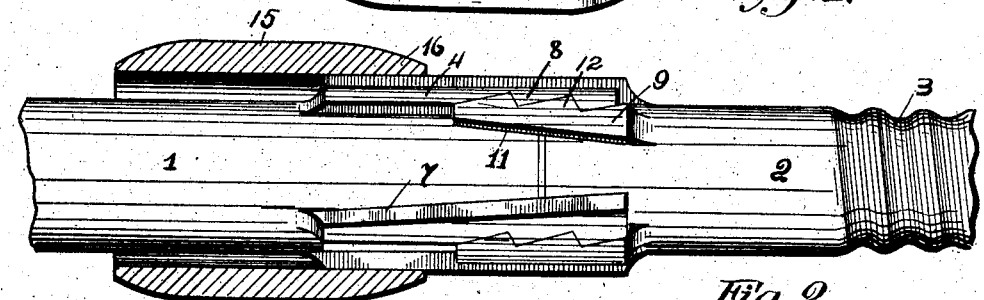
Figure 3:
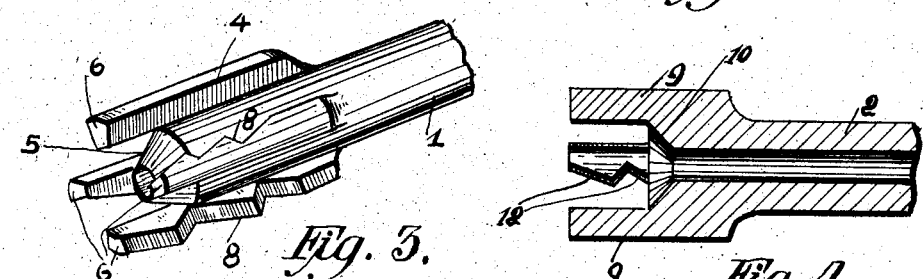
Figure 4:
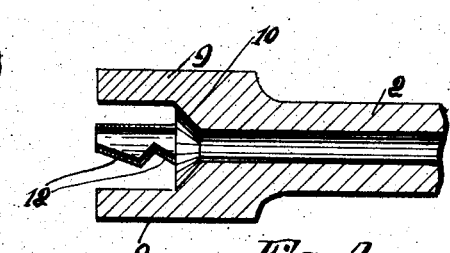
Figure 5:
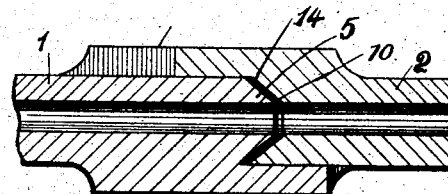
Figure 6:
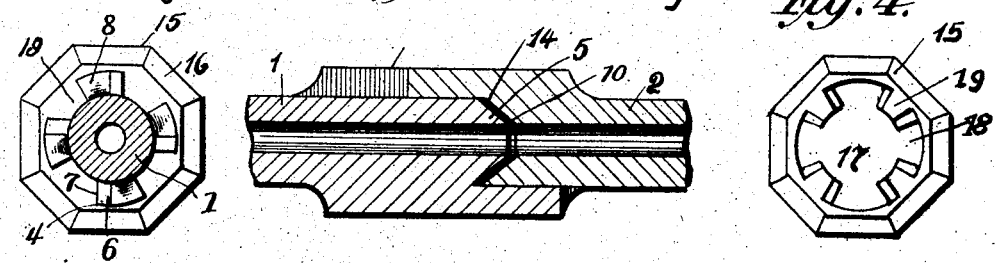
Figure 7:
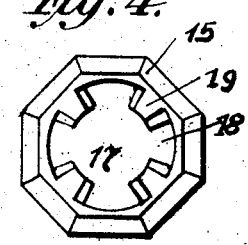

Figure 1 is a side elevation of my improved coupling. Fig. 2 is a side elevation of the coupling, showing the locking-sleeve in section and partly removed from the same. Fig. 3 is a detail perspective view of one end of a pipe constructed in accordance with my invention. Fig. 4 is a longitudinal sectional view of a portion of a pipe in which the end of the pipe illustrated in Fig. 3 is adapted to engage. Fig. 5 is an end view of my improved coupling. Fig. 6 is a longitudinal sectional view of the end of two pipes secured together with the locking-sleeve removed, and Fig. 7 is an end view of the locking-sleeve.

To put my invention into practice, I employ two sections of pipe 1 and 2, and upon the confronting ends of these sections I construct my improved lock for securing the two pipe-sections together. Where the coupling is employed as a hose-coupling, I provide the ends of the pipe-sections 1 and 2 with annular corrugations 3, whereby the sections of hose may be secured to the pipe-sections, this construction being common and ordinarily used. Formed integral with the pipe-section 1 is a plurality of outwardly-extending raised arms 4, these arms lying parallel to the longitudinal axis of the pipe, and they protrude a short distance beyond the end of the pipe, as clearly illustrated in Fig. 3 of the drawings. The end of the pipe is tapered, as designated by the reference-numeral 5, the object of which will be hereinafter more fully described. Each one of the arms 4 is wedge-shaped in form, as designated by the reference-numeral 6, and the one side of each arm is preferably cut away to form a taper 7, while the opposite side of each arm is provided with teeth 8.

The construction employed on the pipe-section 2 will now be described, and reference will be had to Fig. 4 of the drawings. This pipe-section is provided with outwardly-extending raised arms 9 9, which are also formed integral with the end of the pipe, this end having a cone-shaped seat 10 formed therein to receive the tapered end 5 of the pipe-section 1. The upwardly-extending arms 9 are constructed similar to the arms 4 4 of the pipe-section 1, with the exception that they are shorter than the arms 4 4, as clearly shown in Fig. 2 of the drawings. These arms 9 are also tapered, as designated by the reference-numeral 11, and are also formed with teeth 12 upon their one side.

The reference-numeral 14 indicates an annular cone-shaped washer, which is preferably made of rubber, leather, or the like material, that is placed in the cone-shaped seat 10 of the pipe-section 2 prior to securing the two sections together.

The reference-numeral 15 designates a sleeve which, as illustrated in the accompanying drawings, is octagon in cross-section, although this sleeve may be formed square or hexagon, if desired, and the exterior sides of the ends of the sleeve are tapered, as designated by the reference-numeral 16. The sleeve is made with a bore 17 of the same diameter as the pipe 1; but the inner sides of the sleeve are provided with wedge-shaped grooves 18, which form wedge-shaped ribs 19.

The manner of securing the two pipe-sections together that are constructed in accordance with my invention is as follows: The two pipe-sections 1 and 2 are placed together by placing the arms 9 of the pipe-section 2 between the arms 4 of the pipe-section 1 and slightly rotating one of the pipe-sections until the teeth 12 of the arms 9 engage the teeth 8 of the arms 4. This movement will firmly seat the tapered end 5 of the pipe-section 1 within the cone-shaped seat 10 of the pipe-section 2, and the sleeve 15 is then moved along the pipe-section 1 to engage the arms 4 and 9. This sleeve is preferably mounted upon one of the sections of the pipe, as illustrated in Figs. 1 and 2 of the drawings, and is mounted upon the section 1, and this sleeve is adapted to be moved along to engage over the arms 4 and 9, the tapered ribs 19 engaging between the space which exists between the arms 9 and the arms 4, while these arms will engage in the tapered slots formed between the ribs 19 19 of the sleeve 15. The action of forcing this sleeve over the arms will wedge the same in position, and the arms 4 and 9 will be held in engagement with each other and the pipe-sections will be prevented from becoming disconnected by the teeth 8 of the arms 4 engaging the teeth 12 of the arms 9, the wedging action of the sleeve firmly holding the teeth together.

It will be observed in the drawings that I have illustrated four arms as being formed on each of the pipe-sections, and I have employed this number owing to the fact that upon small sections of pipe this number of interlocking arms will firmly lock the confronting ends of two sections together, and I wish it to be understood that on large sections of pipe where this coupling is to be employed any number of arms may be used which will insure a perfect locking of the two sections together. In Fig. 6 of the drawings it will be seen how the arms overlap each section of pipe and the connection between the bores of each pipe will be so formed that it will be impossible for any leak to occur to the cone-shaped recess in which a gasket or washer is mounted.

It will be noted that the general arrangement of the arms upon the ends of the pipe-sections may be slightly changed without departing from the scope of the invention.

What I claim, and desire to secure by Letters Patent, is —

1. The combination with two pipe-sections, of a plurality of outwardly-extending wedge-shaped toothed arms, formed integral with each of said pipe-sections, a washer interposed between said sections, and a sleeve having interior ribs to engage between the arms when the latter are engaged and adapted to lock the arms of one pipe-section into engagement with the arms of the other pipe-section, substantially as described.

2. A pipe-coupling comprising two sections of pipe, one section of pipe having a cone-shaped recess formed therein, the other section of pipe having a tapered end and adapted to fit within said recess, a washer interposed between said sections of pipe, a plurality of outwardly-extending arms formed integral with each of said pipe-sections and adapted to interlock within each other, and means comprising a sleeve having interior ribs adapted to engage between the arms when the teeth of the latter are in mesh for securing the arms of one pipe-section in engagement with the arms of the other pipe-section.

3. The combination with two pipe-sections, of a plurality of outwardly-extending wedge-shaped arms formed integral with each section, said arms having teeth formed therein, a sleeve, said sleeve having wedge-shaped grooves formed therein in which said arms are adapted to engage.

4. A pipe-coupling comprising two sections of pipe, the end of one of said sections having a cone-shaped recess formed therein, the end of the other section being formed tapered and adapted to fit within said recess, a washer interposed between said sections, a plurality of outwardly-extending wedge-shaped arms formed integral with each section, said arms being formed upon the periphery of each section and having teeth formed therein, a sleeve having wedge-shaped grooves formed therein in which said arms are adapted to engage.

5. A coupling comprising two pipe-sections, arms carried by each of said sections, said arms having teeth formed thereon, and a sleeve adapted to slide over said arms and lock the teeth of each arm in engagement with the other, substantially as described.

In testimony whereof I affix my signature in the presence of two witnesses.

WILLIAM J. WILLIAMS.

Witnesses:
E. E. POTTER,
K. H. BUTLER.